Oct. 4, 1932.    J. E. LORENTZ    1,881,026

PNEUMATIC TIRE

Filed Feb. 20, 1929

INVENTOR
JOHN E. LORENTZ
BY
*Richey & Watts*
ATTORNEY

Patented Oct. 4, 1932

1,881,026

UNITED STATES PATENT OFFICE

JOHN E. LORENTZ, OF AKRON, OHIO, ASSIGNOR TO INDIA TIRE & RUBBER COMPANY, OF MOGADORE, OHIO, A CORPORATION OF OHIO

PNEUMATIC TIRE

Application filed February 20, 1929. Serial No. 341,348.

This invention relates to pneumatic tires. More particularly it relates to an improved bond or union between the layers of rubber composition composing a pneumatic tire.

As pneumatic tires are commonly constructed they are assembled of superimposed plies of unvulcanized rubber composition and fabric constituting a carcass which carries one or more layers of lightly compounded rubber composition which may constitute a breaker or cushion, or both. Upon this layer of rubber composition there is disposed a layer of relatively heavily compounded rubber composition which constitutes the tread of the tire. As customarily constructed the engaging surfaces of the thread and cushion are smooth and form no mechanical interengagement. In such a construction the body or union between the tread stock and cushion after vulcanization of the casing is not sufficiently strong to satisfactorily withstand the stresses and strains of actual use, particularly in the presence of the high temperatures resulting from friction during use and consequently the layers of tread and cushion frequently become separated.

It is an object of this invention to provide an improved construction of the adjoining faces of the tread and cushion of a pneumatic tire whereby a high degree of strength of bond is attained therebetween.

Figure 1:
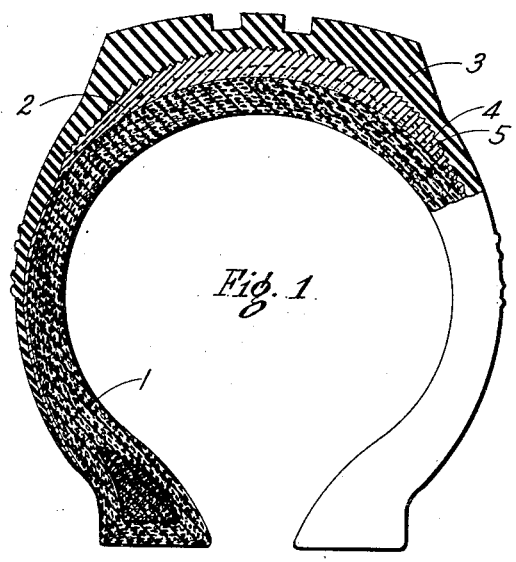
Figure 2:
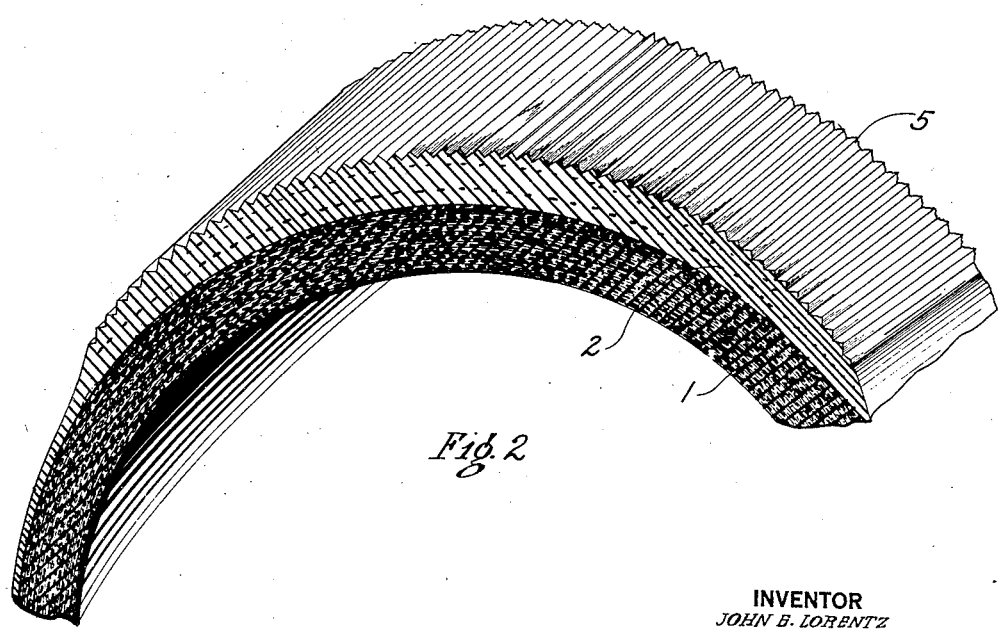

Other objects will be apparent from the specification and from the accompanying drawing in which latter Fig. 1 is a transverse sectional view of a pneumatic tire casing;

Fig. 2 is a perspective view of a pneumatic tire casing with the tread stock removed showing the circumferentially extending serrations in the cushion.

Referring to the drawing, in its preferred embodiment the pneumatic tire comprises a carcass 1 formed of a plurality of superimposed layers of rubber and fabric. Upon the carcass 1 there is disposed a cushion 2 which in the form shown extends from bead to bead around the tire. The cushion is formed of relatively lightly compounded rubber composition as, for example, a composition containing approximately 89 per cent of rubber by volume. Such a composition will be relatively soft when unvulcanized and readily compressed and shaped to any desired shape.

A tread 3 is disposed upon the cushion and in the form shown extends from bead to bead around the tire. The tread is normally and preferably formed of a relatively heavily compounded rubber composition as, for example, a composition containing approximately 76.3 per cent rubber by volume. Such a composition is relatively stiff when unvulcanized and retains its form under relatively high pressures as compared with the soft cushion composition above described.

The tread is preferably formed by extruding a mass of the composition above described while warm through an extruding machine from which it issues in an elongated strip having the shape of a tread. The mouth of the extruding machine is preferably provided with notches or teeth which are adapted to engage the portion of the tread stock which is to form the underside of the tread. The teeth form a plurality of ribs or projections 4 which project from the tread and extend longitudinally of the strip forming an undulated surface. The tread is disposed with the serrated under surface resting upon the cushion of the tire after which the thus assembled tire casing is placed in a mold and subjected to temperatures and pressure sufficient to effect vulcanization. The pressure from the mold forces the plies of rubber and fabric into close engagement and thereby forces the teeth or projections 4 on the under surface of the tread into the cushion stock thereby grooving or recessing the outer surface of the cushion stock and forming a series of inter-engaging projecting ribs 4 and 5 which effect interlocking engagement of the tread and cushion. The thus formed tread and cushion is vulcanized into fixed condition assuming a definite set. The serrations or projections 4 upon the tread stock are preferably formed relatively deep in order that they will still project to a substantial extent after the resistance of the composition of the cushion has been overcome during the compressing operation.

By the construction described there is obtained a greatly increased bonded surface between the tread and cushion thereby increasing the amount of bond which must be overcome in effecting rupture between the tread and cushion. At the same time there has been obtained a mechanical interlocking of portions of the tread and cushion, which operates to prevent rupture of the two parts. It will be understood that the tooth interengagement of the tread and cushion can be extended from bead to bead if desired or be utilized at the portion which may be demonstrated to be under the greatest strain. It will be understood that various modifications may be made in the shape and direction of the serrations so as to effect a greater or less interlocking engagement between the tread and cushion.

While a preferred embodiment of the invention has been shown and described it will be understood that various modifications may be made therein within the scope of the appended claims.

Claims:

1. In constructing a pneumatic tire casing the step which comprises roughening the surface of a body of unvulcanized rubber composition, and compressing the body and a second body of unvulcanized rubber composition together with the roughened surface therebetween whereby the area of contact of the bodies is increased.

2. In constructing a tire casing the step which comprises extruding unvulcanized rubber composition to form a tread having a serrated under surface, and compressing the tread and a body of relatively soft unvulcanized rubber composition together with the serrated surface therebetween whereby the surface of the body becomes serrated.

3. In a tire casing, a carcass including a base composed of layers of fabric and a cushioning element, a tread element superimposed upon the cushioning element, means for enlarging the surface contact area between the tread and the cushioning element comprising a series of circumferential corrugations on the tread element in the side opposite the tread surface adapted to be impressed into the cushioning element.

4. In a tire casing, a carcass including a base composed of layers of fabric and a cushioning element, a relatively harder tread element superimposed upon the cushioning element, means for enlarging the surface contact area between the tread and the cushioning element comprising a series of circumferential corrugations on the tread element in the side opposite the tread surface adapted to be impressed into the cushioning element.

In testimony whereof I hereunto affix my signature this 15th day of February, 1929.

JOHN E. LORENTZ.